United States Patent
Fujita

(10) Patent No.: US 10,014,671 B2
(45) Date of Patent: Jul. 3, 2018

(54) WIRE SPLICING DEVICE, WIRE SPLICING METHOD, AND METHOD FOR MANUFACTURING SPLICE STRUCTURE

(71) Applicant: FUJIKURA LTD., Koto-ku, Tokyo (JP)

(72) Inventor: Shinji Fujita, Sakura (JP)

(73) Assignee: FUJIKURA LTD., Tokyo (JP)

( * ) Notice: Subject to any disclaimer, the term of this patent is extended or adjusted under 35 U.S.C. 154(b) by 18 days.

(21) Appl. No.: 15/399,995

(22) Filed: Jan. 6, 2017

(65) Prior Publication Data
US 2017/0117689 A1    Apr. 27, 2017

Related U.S. Application Data

(62) Division of application No. 14/893,814, filed as application No. PCT/JP2014/064184 on May 28, 2014, now Pat. No. 9,685,769.

(30) Foreign Application Priority Data

May 28, 2013   (JP) ................. 2013-112141

(51) Int. Cl.
*B23K 31/02*   (2006.01)
*H02G 1/00*   (2006.01)
(Continued)

(52) U.S. Cl.
CPC ........... *H02G 1/005* (2013.01); *B23K 1/0008* (2013.01); *B23K 1/0016* (2013.01); *B23K 1/19* (2013.01);
(Continued)

(58) Field of Classification Search
CPC ........ H02G 1/005; H01B 12/04; H01B 12/00; B23K 1/19; B23K 1/0008; B23K 3/087;
(Continued)

(56) References Cited

U.S. PATENT DOCUMENTS 2,062,886 A * 12/1936 Jensen ................. B23K 1/0008
174/84 R
2,838,593 A *  6/1958 Scesa ..................... H01R 4/022
174/84 R
(Continued)

FOREIGN PATENT DOCUMENTS

EP       1 090 706 A1    4/2001
JP       1-165590 U     11/1989
(Continued)

OTHER PUBLICATIONS

Partial Supplementary European Search Report in counterpart European Application No. 14 80 4200.5 dated Apr. 3, 2017 (8 pages)
(Continued)

*Primary Examiner* — Kiley Stoner
(74) *Attorney, Agent, or Firm* — Osha Liang LLP

(57) ABSTRACT

A wire splicing method including: disposing a tape-like first wire and a tape-like second wire in a holding base so that an end portion of the first wire and an end portion of the second wire face each other; disposing solder to straddle the first wire and the second wire; disposing a connection wire on the solder; pressing a heating body to the first wire, the second wire, and the connection wire via a pressing plate, and pressing together and heating the first wire, the second wire, and the connection wire so as to melt the solder; keeping the first wire, the second wire, and the connection wire pressed together by the pressing plate; separating the heating body from the pressing plate; and cooling the pressing plate to solidify the solder, and thereby connecting the first wire and the second wire together.

6 Claims, 6 Drawing Sheets

(51) Int. Cl.

| | | |
|---|---|---|
| B23K 20/00 | (2006.01) | |
| H01R 4/68 | (2006.01) | |
| B23K 1/00 | (2006.01) | |
| B23K 3/04 | (2006.01) | |
| B23K 3/08 | (2006.01) | |
| B23K 37/04 | (2006.01) | |
| H01B 12/00 | (2006.01) | |
| H01R 43/02 | (2006.01) | |
| H01R 4/02 | (2006.01) | |
| B23K 1/19 | (2006.01) | |
| H01B 12/04 | (2006.01) | |
| B23K 101/32 | (2006.01) | |

(52) U.S. Cl.
CPC ............... *B23K 3/04* (2013.01); *B23K 3/085* (2013.01); *B23K 3/087* (2013.01); *B23K 20/004* (2013.01); *B23K 37/0408* (2013.01); *H01B 12/00* (2013.01); *H01B 12/04* (2013.01); *H01R 4/022* (2013.01); *H01R 4/027* (2013.01); *H01R 4/68* (2013.01); *H01R 43/02* (2013.01); *H01R 43/0263* (2013.01); *B23K 2201/32* (2013.01)

(58) Field of Classification Search
CPC .. B23K 1/0016; B23K 37/0408; B23K 3/085; B23K 3/04; B23K 2201/32; B23K 20/004; B23K 20/02–20/06; B23K 37/04–37/0443; H01R 4/022; H01R 43/0263; H01R 4/027; H01R 43/02; H01R 4/68
USPC ... 228/180.5, 904, 4.5, 245–262, 49.1, 49.4, 228/44.3, 44.7
See application file for complete search history.

(56) References Cited

U.S. PATENT DOCUMENTS

| | | | | |
|---|---|---|---|---|
| 2,845,521 A * | 7/1958 | Trickle, Jr. | ........... | B23K 1/0004 219/85.14 |
| 3,336,657 A * | 8/1967 | Flaming | ................. | B21D 39/03 228/125 |
| 3,346,351 A * | 10/1967 | Flashman | .............. | B23K 35/26 174/15.4 |
| 3,821,048 A * | 6/1974 | Acker et al. | ............ | B29C 65/08 156/157 |
| 4,786,760 A * | 11/1988 | Friedhelm | ............. | H01L 41/087 174/75 R |
| 5,098,009 A * | 3/1992 | Tsuchida | .............. | B23K 1/0008 228/189 |
| 5,125,559 A * | 6/1992 | Ege | ...................... | B23K 1/0008 219/57 |
| 5,660,742 A | 8/1997 | Warner et al. | | |
| 5,861,788 A * | 1/1999 | Ohkura | ..................... | H01F 6/06 335/216 |
| 5,967,399 A * | 10/1999 | Takada | ................. | B23K 20/004 228/101 |
| 5,996,879 A * | 12/1999 | Takada | .................. | B23K 20/02 228/179.1 |
| 6,027,009 A | 2/2000 | Shinchi | | |
| 6,677,529 B1 * | 1/2004 | Endacott | ................ | H01R 4/187 174/84 C |
| 6,844,064 B1 * | 1/2005 | Ayai | ........................ | H01L 39/02 428/369 |
| 8,091,757 B1 | 1/2012 | Stawarski | | |
| 2002/0020546 A1 * | 2/2002 | Ueyama | .................. | H01L 39/02 174/125.1 |
| 2010/0206458 A1 * | 8/2010 | Yamada | .................. | B29C 65/08 156/73.4 |
| 2015/0045229 A1 * | 2/2015 | Mitsuhashi | ............ | H02G 15/34 505/230 |
| 2015/0307281 A1 * | 10/2015 | Gilg | ........................ | B23K 1/002 198/847 |
| 2016/0190788 A1 * | 6/2016 | Mitsuhashi | .............. | H01R 4/68 174/84 R |
| 2016/0207129 A1 * | 7/2016 | Ritchey | ................ | B23K 1/0008 |
| 2016/0247607 A1 * | 8/2016 | Oh | ........................ | B23K 20/023 |
| 2016/0352027 A1 * | 12/2016 | van der Laan | .......... | H01R 4/68 |
| 2017/0125924 A1 * | 5/2017 | Lalitha | ..................... | H01R 4/68 |
| 2017/0288323 A1 * | 10/2017 | Sato | ........................ | H01F 6/06 |
| 2018/0063968 A1 * | 3/2018 | Holec | .................... | H05K 3/363 |

FOREIGN PATENT DOCUMENTS

| | | |
|---|---|---|
| JP | 6-96828 A | 4/1994 |
| JP | 7-135034 A | 5/1995 |
| JP | 11-16618 A | 1/1999 |
| JP | 11-214112 A | 8/1999 |
| JP | 2007-12582 A | 1/2007 |
| JP | 2011-3382 A | 1/2011 |

OTHER PUBLICATIONS

United States Notice of Allowance in related U.S. Appl. No. 14/893,814 dated Feb. 12, 2017 (9 pages).
Supplementary Partial European Search Report in counterpart European Application No. 14 80 4200.5 dated Jul. 7, 2017 (14 pages).
Extended European Search Report issued in corresponding European Application No. 17192557.1 dated Nov. 22, 2017 (8 pages)
Japanese Notice of Allowance for JP 2014-528726 dated Aug. 5, 2014.
Notice of Allowance issued in related U.S. Appl. No. 15/399,951 dated Apr. 11, 2018 (9 pages).

\* cited by examiner

WIRE SPLICING DEVICE, WIRE SPLICING METHOD, AND METHOD FOR MANUFACTURING SPLICE STRUCTURE

This application is a Divisional of U.S. application Ser. No. 14/893,814, filed on Nov. 24, 2015, claiming priority from Japanese Patent Application No. JP 2013-112141, filed on May 28, 2013, which claims priority from PCT/JP2014/064184, filed on May 28, 2014. The entire disclosures of the prior applications are considered part of the disclosure of the accompanying continuation application, and are hereby incorporated by reference.

TECHNICAL FIELD

Background Art

In order to use a wire such as a superconducting wire in a device, there is an increasing demand for a connection technique for connecting wires with solder. For example, PTL 1 discloses a connection device 100 which connects superconducting wires together (see FIG. 5). The connection device 100 includes a lower pressing and heating plate 101B provided with a wire accommodation groove 102 having substantially the same width as that of a wire, and an upper pressing and heating plate 101A provided with a protrusion 112A having a slightly smaller width than that of the wire accommodation groove 102, and is configured so that the opening of the lower pressing and heating plate 101B is covered with the upper pressing and heating plate 101A by an opening and closing mechanism 108 and thus heating and pressing can be performed on the wire. When the wires are bonded together, the end portions of the wires are accommodated in the wire accommodation groove 102 in an overlapping manner with solder interposed therebetween, and as pressing together and heating are performed by the lower pressing and heating plate 101B and the upper pressing and heating plate 101A, the solder is melted to connect the superconducting wires.

Since the connection device 100 is used, an operator does not need to melt the solder by using a soldering iron in order to connect the superconducting wires. That is, it is possible to form a splice structure that exhibits stable connection performance regardless of the skill of the operator.

PRIOR ART DOCUMENTS

Patent Documents

[PTL 1] Japanese Unexamined Patent Application, First Publication No. 2011-3382

SUMMARY OF THE INVENTION

Problems to be Solved by the Invention

In the connection device 100 described in PTL 1, heat and pressure are applied to the wires by the pair of heating and pressing plates 101A and 101B provided with both a heating member and a pressing unit. Therefore, in a case where the connection device 100 is used, there is a need to cool the heating member (for example, a heater) itself in order to solidify the solder at the connection portion. Therefore, a long time is needed to make the connection. In addition, when a connection operation is continuously performed using the same device, the cooled heater needs to be re-heated, and thus a long time is needed to sufficiently heat up the heater. Therefore, there is a problem in that the production efficiency is poor.

The present invention has been made taking the foregoing circumstances into consideration, and an object thereof is to provide a wire splicing device which enables connection of wires that exhibit stable performance with high production efficiency, a wire splicing method, and a method for manufacturing a splice structure.

Means for Solving the Problems

According to a first aspect of the present invention, there is provided a wire splicing device including: a holding base which is provided with a wire accommodation groove having a width, the wire accommodation groove being configured to accommodate a plurality of wires; a pressing plate which is positioned above the holding base; a heating body which is positioned above the pressing plate and includes a heating member; a first driver which drives the holding base and the pressing plate toward or away from one another; and a second driver which drives the holding base and the heating body toward or away from one another, in which the pressing plate which is driven toward the holding base by the first driver presses together the plurality of wires accommodated in the wire accommodation groove with solder interposed therebetween, and the heating body which is driven toward the holding base by the second driver presses together and heats, via the pressing plate, the plurality of wires accommodated in the wire accommodation groove with solder therebetween.

In the wire splicing device according to the first aspect, the pressing plate which presses a connection portion of the wires and the heating body which heats the connection portion are separately provided, and the pressing plate and the heating body can be separately driven toward and separated from the connection portion of the wires by the first driver and the second driver. Therefore, the connection portion of the wires is heated by the heating body via the pressing plate so as to melt the solder, the heating body is thereafter separated from the pressing plate (that is, separated from the wires) while continuing to be pressed by the pressing plate, and heating of the wires can be immediately stopped. Accordingly, the wires are not continuously heated until the heating body has been cooled, and the time required to solidify the solder is reduced. Therefore, the time needed to make the connection is reduced.

The wire splicing device according to the first aspect can be used to connect tape-like superconducting wires represented by a Bi-based or RE-123-based superconducting wire. There may be a case where the superconducting properties of the superconducting wires may deteriorate due to heat. However, the wire splicing device according to the first aspect can limit the deterioration of the superconducting wires by reducing the heating time. In addition, there may be a case where a protection layer made of silver or a silver alloy is provided on the outer periphery of the superconducting wire. The protection layer functions as a bypass in a case where the superconducting state of the superconducting wire has collapsed, and thus preferably has low resistance. When the heating time during the connection is lengthened, solder in the protection layer diffuses and may form an alloy of solder and silver. The alloy of solder and silver has high electrical resistance and does not allow functions as bypasses to be sufficiently exhibited. The wire splicing device according to the first aspect can limit the diffusion of the solder to the protection layer by reducing the heating time.

In the wire splicing device according to the first aspect, since heating the connection portion of the wires is started or stopped by bringing the heating body into contact with the pressing plate or separating it therefrom, the heating body can always be held at a temperature at which the solder melts. Therefore, in a case where a subsequent connection operation is consecutively performed, the heating body does not need to be re-heated, and the time it takes to increase the temperature of the heating body to a temperature at which the solder is melted can be reduced.

Furthermore, a plate-like pressing plate has a large surface area, has high heat dissipation properties, and thus can quickly reduce the temperature of the connection portion, and thereby reduce the time needed to solidify the solder. That is, the production efficiency can be improved.

In addition, in the first aspect, the holding base may be made of an insulating material.

In this case, since the holding base is made of the insulating material, an increase in the temperature of the holding base is suppressed even when a bonding portion of the wires is heated, and thus the solidification of the solder is not impeded during cooling, and thereby the production efficiency is increased.

In addition, the wire splicing device in the first aspect may further include a cooling member which cools the pressing plate.

In the case where the cooling member which cools the pressing plate is included, in a state where the heating body is separated from the pressing plate after the solder is melted, the pressing plate can be rapidly cooled. Therefore, the time needed to solidify the solder of the connection portion is reduced, and thereby the production efficiency is increased.

In addition, in the first aspect, the first driver may be a first air cylinder which raises and lowers the pressing plate (moves the pressing plate up and down), and the second driver may be a second air cylinder which raises and lowers the heating body (moves the heating body up and down).

Since the air cylinders are used as the first driver and the second driver, the wires can be pressed together at a predetermined pressure, and thus the breaking of the wires can be limited.

According to a second aspect of the present invention, there is provided a wire splicing method including: disposing an end portion of a tape-like first wire and an end portion of a tape-like second wire in a holding base in an overlapping manner via solder (wire disposing process), pressing a heating body to the first wire and the second wire via a pressing plate, and pressing together and heating the first wire and the second wire so as to melt the solder (pressing together and heating process); and keeping the first wire and the second wire pressed together using the pressing plate, separating the heating body from the pressing plate, and cooling the pressing plate to solidify the solder, and thereby connect the first wire and the second wire together (cooling process).

According to a third aspect of the present invention, there is provided a wire splicing method including: disposing a tape-like first wire and a tape-like second wire in a holding base so that an end portion of the first wire and an end portion of the second wire oppose each other; disposing solder to straddle the first wire and the second wire; disposing a connection wire on the solder (wire disposing process); pressing a heating body to the first wire, the second wire, and the connection wire via a pressing plate, and pressing together and heating the first wire, the second wire, and the connection wire so as to melt the solder (pressing together and heating process); and keeping the first wire, the second wire, and the connection wire pressed together using the pressing plate, separating the heating body from the pressing plate, and cooling the pressing plate to solidify the solder, and thereby connect the first wire and the second wire together (cooling process).

According to the wire splicing method according to the second or third aspect, since the wire splicing device is used, connection of wires that exhibit stable performance is enabled with high production efficiency.

In addition, in the second or the third aspect, the first wire and the second wire may be superconducting wires.

In addition, in the third aspect, the first wire, the second wire, and the connection wire may be superconducting wires.

In this case, heat is not excessively applied to the superconducting wires, and the first wire and the second wire can be connected together by being heated for a short amount of time. Therefore, deterioration in the properties of the superconducting wires during the connection can be limited.

In a fourth aspect of the present invention, there is provided a method for manufacturing a splice structure including: disposing an end portion of a tape-like first wire and an end portion of a tape-like second wire in a holding base in an overlapping manner via solder; pressing a heating body to the first wire and the second wire via a pressing plate, and pressing together and heating the first wire and the second wire so as to melt the solder; and keeping the first wire and the second wire pressed together by the pressing plate, separating the heating body from the pressing plate, and cooling the pressing plate to solidify the solder, and thereby connect the first wire and the second wire together.

In a fifth aspect of the present invention, there is provided a method for manufacturing a splice structure including: disposing a tape-like first wire and a tape-like second wire in a holding base so that an end portion of the first wire and an end portion of the second wire to oppose each other; disposing solder to straddle the first wire and the second wire; disposing a connection wire on the solder; pressing a heating body to the first wire, the second wire, and the connection wire via a pressing plate, and pressing together and heating the first wire, the second wire, and the connection wire so as to melt the solder; and keeping the first wire, the second wire, and the connection wire pressed together by the pressing plate, separating the heating body from the pressing plate, and cooling the pressing plate to solidify the solder, and thereby connecting the first wire and the second wire together.

In addition, in the fourth or the fifth aspect, the first wire and the second wire may be superconducting wires.

In addition, in the fifth aspect, the first wire, the second wire, and the connection wire may be superconducting wires.

In this case, heat is not excessively applied to the superconducting wires, and the first wire and the second wire can be connected together by heating for a short amount of time. Therefore, deterioration in the properties of the superconducting wires during the connection can be limited.

Effects of the Invention

According to the wire splicing device, the wire splicing method, and the method for manufacturing a splice structure according to the above aspects, the pressing plate which presses together the connection portion of the wires and the heating body which heats the connection portion are separately provided, and the pressing plate and the heating body can be separately driven towards and separated from the connection portion of the wires by the first driver and the second driver. Therefore, the connection portions of the wires is heated by the heating body via the pressing plate so as to melt the solder, the heating body is thereafter separated from the pressing plate (that is, separated from the wires) while the pressing plate continues to press together the connection portions of the wires, and heating of the wires can be immediately stopped. Accordingly, the wires are not continuously heated until the heating body is cooled, and the time required to solidify the solder is reduced. Therefore, a time required to make the connection is reduced. Furthermore, the plate-like pressing plate has a large surface area, has high heat dissipation properties, and thus can quickly reduce the temperature of the connection portion, and thereby reduce the time needed to solidify the solder. That is, the production efficiency can be improved.

In addition, according to the wire splicing device, the wire splicing method, and the method for manufacturing a splice structure according to the above aspects, since heating the connection portion of the wires is started or stopped by bringing the heating body in contact with or separating the heating body from the pressing plate, the heating body can be always held at a temperature at which the solder is melted. Therefore, in a case where a subsequent connection operation is consecutively performed, the heating body does not need to be re-heated, and the time it takes to increase the temperature of the heating body to the temperature at which the solder is melted can be reduced.

DETAILED DESCRIPTION OF THE INVENTION

Figure 1A:
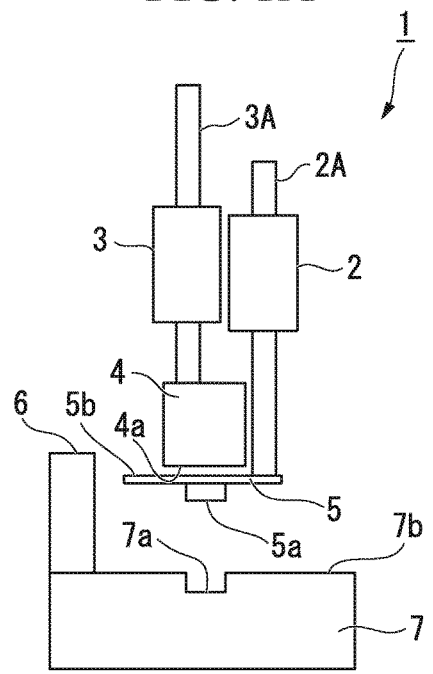
FIG. 1A is a side view showing a wire splicing device according to an embodiment of the present invention.

Hereinafter, an embodiment of a wire splicing device according to the present invention will be described with reference to the drawings. There is a case where, in the drawings referred to in the following description, featured parts are exaggerated in order to facilitate understanding thereof, and the dimensional ratios and the like of constituent elements are not limited to being the same as actual ones. In addition, the present invention is not limited to the following embodiment.

(Wire Splicing Device)

Figure 1B:
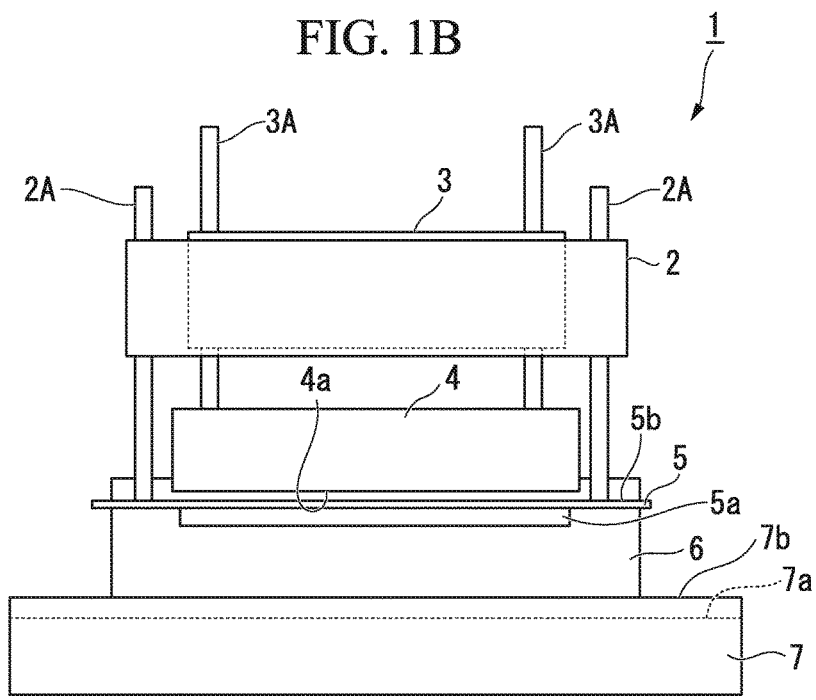
FIG. 1B is a front view showing the wire splicing device according to the embodiment of the present invention.

FIGS. 1A and 1B show a side view and a front view of a wire splicing device 1 according to the embodiment of the present invention.

The wire splicing device 1 includes a holding base 7 on which wires to be connected are placed, a pressing plate 5 disposed above the holding base 7, and a heating body 4 further disposed above the pressing plate 5.

The holding base 7 is a rectangular parallelepiped-shaped base, and an upper surface 7b thereof is formed in a substantially rectangular shape having a long side in a direction coincident with the longitudinal direction of the wires to be connected. In the upper surface 7b, a wire accommodation groove 7a is formed to accommodate the wires along the overall length of the holding base 7 in the longitudinal direction thereof. It is preferable that the depth of the wire accommodation groove 7a be substantially the same as or greater than the sum of the thicknesses of the overlapping portions of the pair of wires to be connected and the thickness of the solder.

Since the width of the wire accommodation groove 7a is substantially the same as the width of the wire, by disposing the wires in an overlapping manner with the solder interposed therebetween in the wire accommodation groove 7a and allowing the solder to be melted and solidified, a splice structure in which the wires are not misaligned from each other can be formed. In addition, the molten solder does not protrude from the side surface of the wires. Therefore, the width dimensions of the connection portion and non-connection portions are not different from each other, and there is no inconvenience during handling of the connection portion.

In addition, clamping mechanisms (not shown) which hold the wires may also be provided in the vicinity of both end portions of the wire accommodation groove 7a in the longitudinal direction thereof. In a case where the clamping mechanisms are provided, the wires can be held by the clamping mechanisms in a state where the wires are disposed in the wire accommodation groove 7a. Therefore, misalignment of the wires in the longitudinal direction thereof can be reliably limited, and thus a portion (the connection portion) in which the wires overlap and are bonded together by the solder can be formed of a predetermined length.

The pressing plate 5 is made of a thin plate material formed in a rectangular shape having a long side in the same direction as the long side of the upper surface 7*b* of the holding base 7, and is formed to be further smaller than the upper surface 7*b* of the holding base 7.

An upper surface 5*b* of the pressing plate 5 is formed to be flat to ensure a contact surface between the upper surface 5*b* and a lower surface 4*a* of the heating body 4 which is also formed to be flat.

In addition, the center portion of the lower surface of the pressing plate 5 is provided with a rectangular parallelepiped-shaped protrusion 5*a* having a slightly smaller width than the width of the wire accommodation groove 7*a* of the holding base 7. The protrusion 5*a* and the wire accommodation groove 7*a* are configured to be fitted with each other without causing misalignment in position when the holding base 7 and the pressing plate 5 overlap each other.

In this embodiment, the height of the protrusion 5*a* is formed to be substantially the same as the depth of the wire accommodation groove 7*a*. However, the height is not particularly limited when the height is formed such that the wires to be connected are accommodated in the wire accommodation groove 7*a* with the solder interposed therebetween and in this state, the upper surfaces of the wires of the connection portion can be pressed.

In addition, in this embodiment, the length of the protrusion 5*a* in the longitudinal direction thereof is a length of about ⅔ of the overall length of the wire accommodation groove 7*a*, and is not particularly limited when the length is equal to or greater than the length of the portion where the wires to be connected overlap each other.

The heating body 4 disposed above the pressing plate 5 has a block shape of which the longitudinal direction is a direction coincident with the longitudinal direction of the pressing plate 5. The heating body 4 includes a heating member and thus can heat the solder of the connection portion to its melting point or higher via the pressing plate 5. The configuration of the heating member is not concerned as long as the heating member is a device capable of heating the lower surface 4*a* of the heating body 4 to the melting point of the solder or higher, and a current-carrying type electric heater or the like may be used. The lower surface 4*a* of the heating body 4 is formed to be flat and is configured to transfer heat of the heating body 4 by coming into surface contact with the upper surface 5*b* of the pressing plate 5. The lower surface 4*a* of the heating body 4 is configured to cover the projection area of the protrusion 5*a* of the pressing plate 5, and accordingly, can immediately heat the connection portion of the wires via the protrusion 5*a*.

First rods 2A that extend in a vertical direction are respectively attached to two corners of the upper surface 5*b* of the pressing plate 5 on one long side among the four corners of the upper surface 5*b*. The pressing plate 5 is held by the pair of first rods 2A and 2A. The pair of first rods 2A and 2A are connected to a first air cylinder (first driver) 2 by penetrating therethrough, and the pressing plate 5 can be elevated in the vertical direction by the first air cylinder 2. In addition, since the pair of first rods 2A and 2A are driven in synchronization with each other, the pressing plate 5 performs parallel movement in the vertical direction.

Similarly, second rods 3A that extend in the vertical direction are respectively attached to the vicinities of both end portions of the upper surface of the heating body 4 in the longitudinal direction of the heating body 4. The heating body 4 is held by the pair of second rods 3A and 3A. The pair of second rods 3A and 3A are connected to a second air cylinder (second driver) 3 by penetrating therethrough, and the heating body 4 can be elevated in the vertical direction by the second air cylinder 3. In addition, since the pair of second rods 3A and 3A are driven in synchronization with each other, the heating body 4 performs parallel movement in the vertical direction.

A tube (not shown) through which compressed air is supplied is connected to the first air cylinder 2 and the second air cylinder 3, and the first rods 2A and 2A or the second rods 3A and 3A are driven in the vertical direction by air pressure.

In addition, the first air cylinder 2 and the second air cylinder 3 are fixed so that the relative distances from the holding base 7 do not change, and fixing units are omitted in FIGS. 1A and 1B.

An air-cooling fan (cooling member) 6 is installed on the long side edge portion of the upper surface 7*b* of the holding base 7 so as to avoid the movement ranges of the pressing plate 5 and the heating body 4. The air-cooling fan 6 is installed for the purpose of air-cooling the pressing plate 5 in a state where the pressing plate 5 is lowered to overlap the holding base 7, and is configured to blow air toward the upper surface 5*b* of the pressing plate 5 in the lowered state.

It is preferable that the blowing opening of the air-cooling fan 6 is configured to have substantially the same length as the long side length of the upper surface 5*b* of the pressing plate 5 so as to air-cool the entirety of the upper surface 5*b* of the pressing plate 5.

The wire splicing device 1 of this embodiment is schematically configured as described above. Hereinafter, each of the constituent parts of the wire splicing device 1 will be described in more detail.

As the material of the holding base 7 which becomes the base on which the wires are disposed, an insulating material which is made of ceramic or the like and has low thermal conductivity and high insulating properties is preferably used. Accordingly, an increase in the temperature of the holding base 7 is suppressed, and thus the solidification of the solder is not impeded, and thereby increases production efficiency.

As the ceramic that can be used as the material of the holding base 7, for example, a machineable ceramic having high insulating properties and high machinability, such as Macor and Photoveel (registered trademarks), may be appropriately used.

The pressing plate 5 exhibits a function of suppressing misalignment between the wires to be connected in the longitudinal direction of the wires (clamping function) and a function of transferring heat of the heating body 4 to the bonding portion of the wires. Therefore, it is preferable that the pressing plate 5 has a strength with which the connection portion of the wires can be sufficiently pressed and has a material and a shape such that heat from the heating body 4 can be sufficiently transferred to the connection portion of the wires.

In addition, the pressing plate 5 has a function of accelerating the cooling of the solder of the bonding portion of the wires by ensuring a heat dissipation area. Therefore, it is preferable that the pressing plate 5 is made of a material having high heat dissipation properties. Specifically, it is preferable that a metal material having a thickness of 1 mm to 10 mm is used. As the metal material, stainless steel or the like is used. Otherwise, a material having a high thermal conductivity and heat transfer coefficient, such as aluminum, copper, and an alloy thereof, is appropriately used.

Since the pressing plate 5 is formed in a thin plate shape, the surface area thereof can be large, and thus the heat dissipation properties can be enhanced. In addition, it is preferable that the pressing plate 5 is formed as thin as possible. Accordingly, heat from the heating body 4 can be efficiently transferred to the connection portion of the wires, and the time needed for cooling can also be shortened, and thereby accelerate the solidification of the solder. That is, the production efficiency can be enhanced.

For the purpose of enhancing heat transfer properties, fins may be provided on the surface of the pressing plate 5. By providing the fins on the surface, the pressing plate 5 is more effectively cooled during the cooling performed by the air-cooling fan 6, and thereby accelerate the solidification of the solder. In the case of providing the fins, fins are not formed on portions that come into contact with the heating body 4.

The pressing plate 5 preferably includes a temperature measurement unit. The temperature measurement unit is not particularly limited as long as the temperature measurement unit can measure a temperature near the melting point of the solder. As an example, a thermocouple or the like may be employed.

Since the pressing plate 5 includes the temperature measurement unit, the temperature of the connection portion of the wires, that is, the molten state of the solder can be determined. Therefore, in a state where the wires are pressed by the heating body 4 via the pressing plate 5, when it is determined that the solder is sufficiently melted, the heating body 4 may be separated from the pressing plate 5, and cooling of the connection portion may be started. Furthermore, when it is determined that the solder is sufficiently solidified, the pressing plate 5 may be separated from the wires, and a connection process may be completed.

Similarly, the heating body 4 preferably includes a temperature measurement unit. In addition, it is preferable that a controller which controls the heating member on the basis of the temperature measured by the temperature measurement unit is provided.

Particularly, in a case where superconducting wires are connected together, in order to prevent a temperature (for example, 300° C. or higher) at which superconducting properties deteriorate due to excessive heating of wires from being reached, the temperature measurement unit and the controller are necessary. As the temperature measurement unit, similarly to the temperature measurement unit provided in the pressing plate 5, a thermocouple may be employed.

In the connection process, the connection portion of the wires is pressed by only the pressing plate 5 or by both the pressing plate 5 and the heating body 4. The pressing force applied to the connection portion needs to be controlled so as not to break the wires. Particularly in the case of connecting the superconducting wires, the pressing force is controlled (for example, to be 20 MPa or lower) such that the crystal structure of the superconductor does not break. Since the wires can be pressed at a predetermined pressure by using the air cylinder as the driver, the breaking of the wires can be suppressed. However, the driver is not limited to the air cylinder, and other drivers such as motor driving may also be employed. In this case, a controller for the pressing force is preferably provided.

In this embodiment, the pressing plate 5 and the heating body 4 are configured to approach the holding base 7 or be separated from the holding base 7 by being raised and lowered by the first air cylinder 2 or the second air cylinder 3. The holding base 7 may also be configured to be provided with any driver so that the holding base 7 is elevated by the driver and the holding base 7 approaches and is separated from the pressing plate 5 and the heating body 4.

The air-cooling fan (cooling member) 6 has a role as a cooling member that cools the pressing plate 5 in a state where the pressing plate 5 overlaps the upper surface 7b of the holding base 7. Since the cooling member that cools the pressing plate 5 is provided, the pressing plate 5 can be rapidly cooled, and thus the time needed to solidify the solder of the connection portion is reduced, and thereby the production efficiency is increased.

As the cooling member, as well as the air-cooling fan 6 used in this embodiment, a water-cooling type cooling member may also be used.

It is preferable that, in the wire splicing device 1 in this embodiment, a storage unit (not shown) which stores optimal connection conditions and a control device (not shown) which controls a series of processes according to the connection conditions stored in the storage unit are built in. Accordingly, by setting the wires to be connected in the wire splicing device 1 and inputting various conditions, the connection process can be automatically completed, and thereby stably, easily, and reliably performing the connection of wires.

(Splice Structure)

Next, the wires connected by the wire splicing device 1 of this embodiment and a splice structure after the connection will be described.

The wire splicing device 1 can be used for connection of various wires as long as the wires are connected by solder, and is particularly appropriately used for connection of superconducting wires.

As the superconductor used for the superconducting wires, $Bi_2Sr_2Ca_2Cu_3O_{10+\delta}$ (Bi2223) as a Bi-based superconducting wire, $REBa_2Cu_3O_{7-X}$ (RE is a rare-earth element) as an RE-123-based superconducting wire, or the like is known.

The Bi-based superconducting wire is manufactured to have a tape-like structure by a Powder In Tube method (PIT method) so that a Bi-based superconducting layer is in a state of being coated with an Ag sheath material.

On the other hand, regarding the RE-123-based superconducting wire, a structure is well known in which an oxide superconducting layer is laminated on a tape-like metal base with an intermediate layer therebetween by a film formation method and a thin silver protection layer is further formed on the oxide superconducting layer. Moreover, a structure in which a metal tape made of a metal material having good conductivity such as copper is further laminated on the protection layer with a solder layer therebetween to function as a stabilizing layer, or the like is known.

The wire splicing device 1 is applied to the connection of tape-like wires and is thus appropriately used for the above-mentioned Bi-based superconducting wire or the RE-123-based superconducting wire.

As the RE-123-based superconducting wire, for example, one having a width of 10 mm and a thickness of about 0.1 mm is an exemplary example.

Figure 2A:
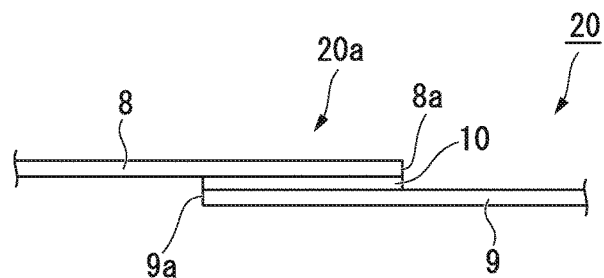
FIG. 2A is a view showing a first splice structure of wires formed by the wire splicing device according to the embodiment of the present invention.

FIG. 2A shows a first splice structure 20 formed by connecting a first wire 8 and a second wire 9, which are a pair of tape-like wires, with solder 10. In the first splice structure 20, portions in which an end portion 8a of the first wire 8 and an end portion 9a of the second wire 9 overlap each other, are bonded together by the solder 10, and thereby form a connection portion 20a.

In a case where RE-123-based superconducting wires having a laminate structure are used as the first wire 8 and the second wire 9 of the first splice structure 20, the superconducting wires are connected together while the protection layers or stabilizing layers which are the uppermost layers of the laminate structures face each other, and thereby the connection portion 20a having low electrical resistance can be formed.

In addition, when superconducting wires having a width of 10 mm are connected, the lengths of portions bonded together by the solder in the longitudinal direction thereof are preferably 10 mm or greater.

Figure 2B:
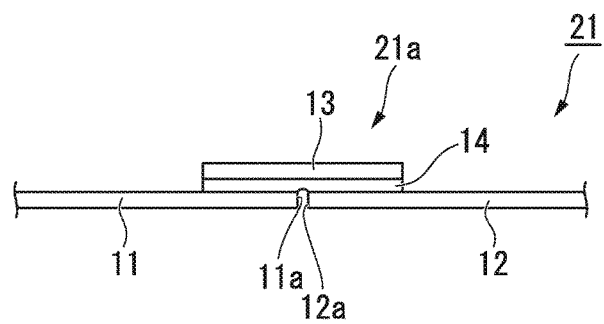
FIG. 2B is a view showing a second splice structure of wires formed by the wire splicing device according to the embodiment of the present invention.

FIG. 2B shows a second splice structure 21 formed by connecting a first wire 11 and a second wire 12, which are a pair of tape-like wires with a tape-like connection wire 13.

In the second splice structure 21, an end portion 11a of the first wire 11 and an end portion 12a of the second wire 12 are disposed facing each other, and a connection wire 13 is bridged to straddle the end portions. Solder 14 is interposed between the first wire 11 and the connection wire 13, and between the second wire 12 and the connection wire 13, and these are bonded by the solder 14, and thereby form a connection portion 21a.

In a case where RE-123-based superconducting wires having a laminate structure are used as the first wire 11, the second wire 12, and the connection wire 13 of the second splice structure 21, the first wire 11 and the second wire 12 are disposed so that the lamination directions thereof are aligned with each other. Furthermore, the protection layer or stabilizing layer of the connection wire 13 is disposed to face the protection layers or stabilizing layers of the first wire 11 and the second wire 12 and the protection layers or stabilizing layers, and they are connected together by the solder. Accordingly, the connection portion 21a having low electrical resistance can be configured.

Otherwise, a metal wire may also be configured as the connection wire 13 while the superconducting wires are used as the first wire 11 and the second wire 12.

The form of the solder 10 and 14 used in the first splice structure 20 and the second splice structure 21 before being melted may be any of a line form, a tape form, and a paste form. As the solder 10 and 14, a well-known solder may be used. For example, In solder having In as a primary component, Sn, Sn solder made of an alloy having Sn as a primary component such as an Sn—Ag-based alloy, an Sn—Bi-based alloy, an Sn—Cu-based alloy, and an Sn—Zn-based alloy, Pb—Sn-based alloy solder, eutectic solder, low temperature solder, or the like may be employed. These solders may be used singly or in a combination of two or more types thereof. Among these, a solder having a melting point of 300° C. or lower is preferably used.

There may be a case where the superconducting properties of the superconducting wires may deteriorate due to an effect of heat. Particularly in a case where the melting point of the solder is 300° C. or higher, the wires are heated to 300° C. or higher. Accordingly, in a case of connecting the superconducting wires together, there is concern that the superconducting properties thereof may deteriorate.

Figure 3:
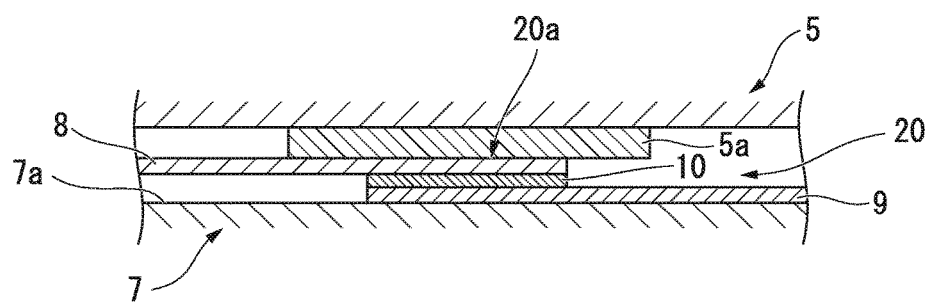
FIG. 3 is a schematic sectional view of a connection portion when the wires are connected together by using the wire splicing device according to the embodiment of the present invention.

FIG. 3 is a schematic sectional view of the connection portion in a case where the above-described first splice structure 20 is formed by the wire splicing device 1 of this embodiment.

The second wire 9, the solder 10, and the first wire 8 are accommodated in the wire accommodation groove 7a of the holding base 7 in this order, and the connection portion 20a is pressed by the protrusion 5a of the pressing plate 5 from above, and is heated by the heating body 4 (see FIGS. 1A and 1B) so as to melt the solder 10. Furthermore, the heating body 4 is separated from the pressing plate 5 to solidify the solder 10, and thereby form the first splice structure 20.

In addition, in a method for forming the second splice structure 21, the first wire 11 and the second wire 12 are disposed in the wire accommodation groove 7a so that the end portion 11a of the first wire 11 and the end portion 12a of the second wire 12 face each other, and the solder 14 is disposed to straddle the first wire 11 and the second wire 12. The connection wire 13 is disposed and accommodated on the solder 14 and is pressed and heated by the pressing plate 5 and the heating body 4 from above so as to melt and solidify the solder, and thereby form the second splice structure 21 described above.

(Connection Order)

Next, an operation order of the wire splicing device 1 during the connection of the wires using the wire splicing device 1 will be described in detail with reference to FIGS. 4A to 4E.

First, the wire splicing device 1 is powered on and heats the heating body 4 to increase the temperature of the lower surface 4a of the heating body 4 to a predetermined temperature (a temperature of equal to or higher than the melting point of the solder). In this initial state, the heating body 4 and the pressing plate 5 may be disposed to be separated from each other or to be in contact with each other. In a case where the heating body 4 and the pressing plate 5 are disposed to be in contact with each other, the pressing plate 5 may be pre-heated and further accelerates the melting of the solder, which is preferable.

Figure 4A:
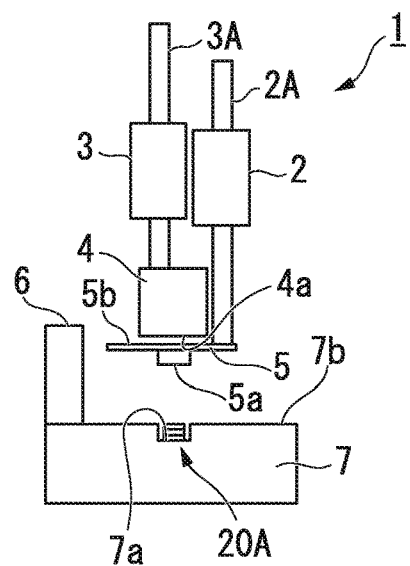
FIG. 4A is a view showing the order in which the wires are connected together by using the wire splicing device according to the embodiment of the present invention, and the wires to be connected being provided with solder interposed therebetween in a wire accommodation groove of a holding base.

Next, as shown in FIG. 4A, a pair of wires to be connected are accommodated in an overlapping manner in the wire accommodation groove 7a of the holding base 7 (wire disposing process). At this time, solder is interposed between the overlapping portions. The pair of overlapping wires and the solder before being melted are called a pre-connection wire 20A.

In addition, in FIG. 4A, for ease of understanding, a gap is formed between the vertical wall of the wire accommodation groove 7a and the side surface of the wire. However, since the width of the groove and the width of the wire are substantially the same, such a gap is not formed.

Figure 4B:
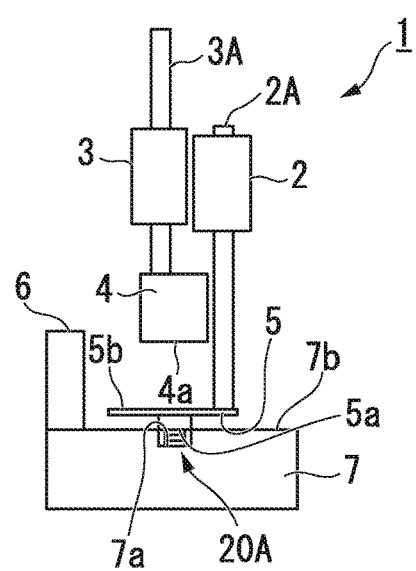
FIG. 4B is a view showing the order in which the wires are connected together by using the wire splicing device according to the embodiment of the present invention, and a connection portion of the wires being pressed by a pressing plate.

Next, as shown in FIG. 4B, the first rods 2A and the pressing plate 5 are lowered by the first air cylinder 2 such that the pressing plate 5 overlaps the holding base 7. In this state, the upper surface of the pre-connection wire 20A is pressed by the protrusion 5a of the pressing plate 5, and thereby preventing misalignment between the wires of the pre-connection wire 20A (see FIG. 3).

Figure 4C:
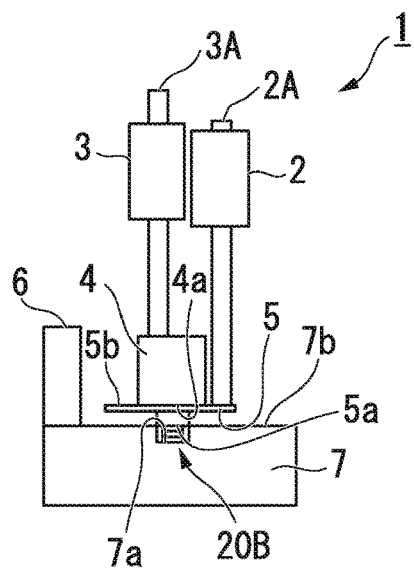
FIG. 4C is a view showing the order in which the wires are connected together by using the wire splicing device according to the embodiment of the present invention, and the connection portion of the wires being heated by a heating body via the pressing plate to solidify the solder.

Next, as shown in FIG. 4C, the second rods 3A and the heating body 4 are lowered by the second air cylinder 3 such that the lower surface 4a of the heating body 4 and the upper surface 5b of the pressing plate 5 come into contact with each other. Accordingly, heat of the heating body 4 is transferred to the pressing plate 5 and is further transferred to the pre-connection wire 20A from the protrusion 5a of the pressing plate 5 so as to melt the solder.

When the solder is melted, the heating body 4 presses the upper surface 5b of the pressing plate 5 by the second air cylinder 3. Therefore, in a state where the pre-connection wire 20A is pressed by not only the pressing plate 5 but also the heating body 4, the solder is melted (pressing and heating process).

The pair of overlapping wires and the molten solder is called a molten solder wire 20B.

In this embodiment, the pressing plate 5 and the heating body 4 are separately lowed as shown in FIGS. 4B and 4C. However, they may also be simultaneously lowered.

Figure 4D:
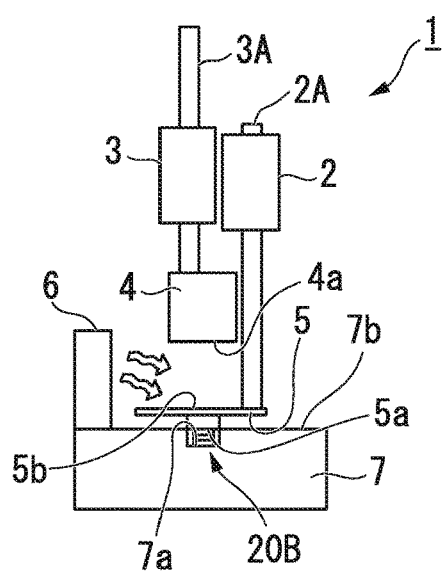
FIG. 4D is a view showing the order in which the wires are connected together by using the wire splicing device according to the embodiment of the present invention, and the heating body being separated from the pressing plate so as to allow the pressing plate to be cooled by an air-cooling fan.

Next, as shown in FIG. 4D, the second rods 3A and the heating body 4 are raised by the second air cylinder 3. At this time, the pressing plate 5 stays on the holding base 7 and continuously presses the upper surface of the molten solder wire 20B until the solder solidifies. In addition, by cooling the upper surface 5b of the pressing plate 5 using the air-cooling fan 6, the temperature of the pressing plate 5 is reduced, and the solidification of the solder is accelerated. Since the connection portion of the wires is continuously pressed until the solder solidifies, excess solder does not partially remain in the connection portion, and a well-finished connection portion can be achieved.

The raised heating body 4 and the pressing plate 5 that stays on the holding base 7 are separated from each other at a sufficient distance at which radiant heat from the heating body 4 is not transferred to the pressing plate 5.

When the pressing plate 5 is sufficiently cooled to a predetermined temperature, the molten solder of the molten solder wire 20B solidifies (cooling process).

Figure 4E:
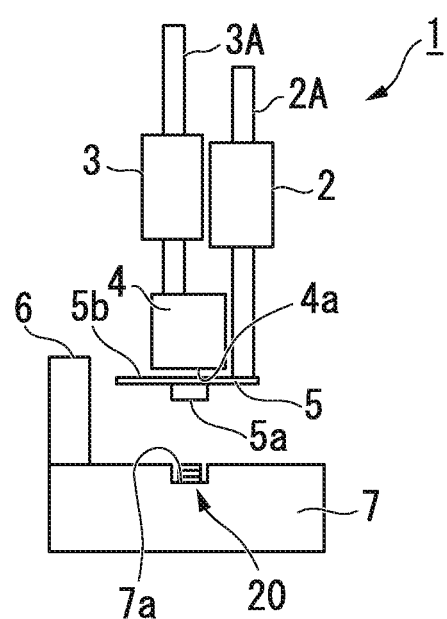
FIG. 4E is a view showing the order in which the wires are connected together by using the wire splicing device according to the embodiment of the present invention, and the solidification of the solder being completed and the pressing plate being separated from the connection portion.
Figure 5:
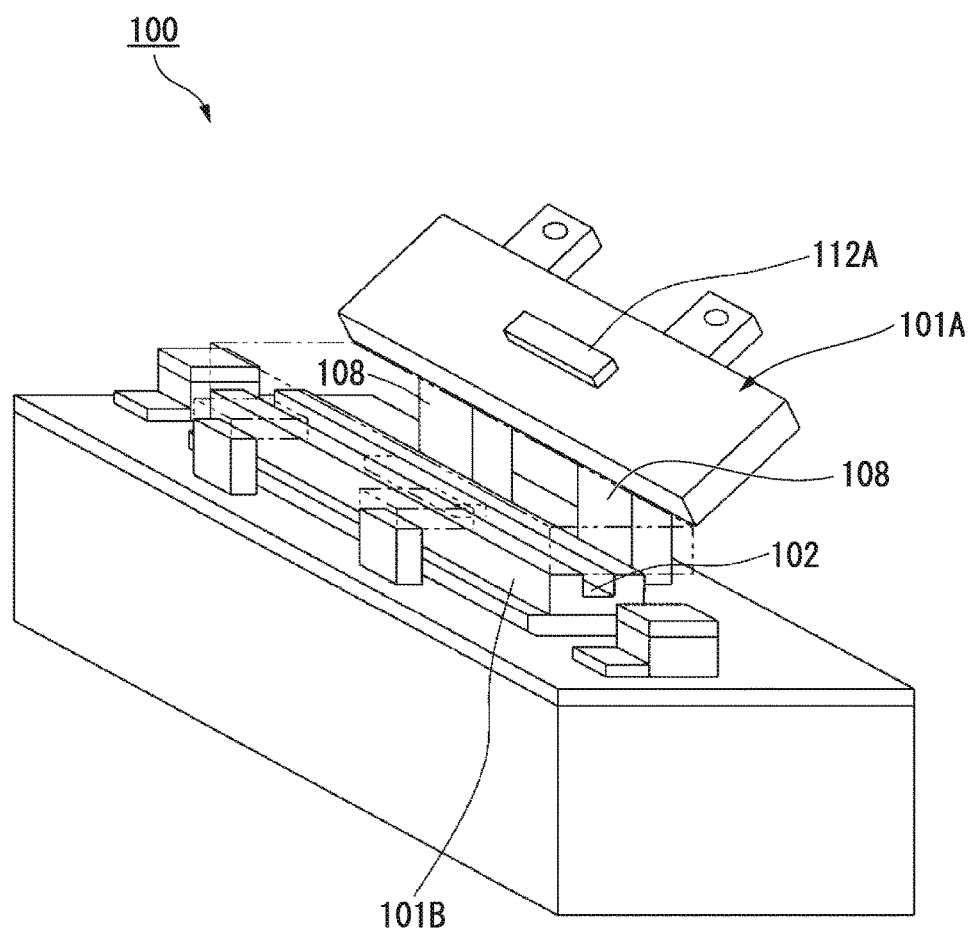
FIG. 5 shows an example of a wire splicing device according to the related art.

When the pressing plate 5 reaches a predetermined temperature or when a predetermined time has elapsed after cooling is started, the fan is stopped. Furthermore, as shown in FIG. 4E, the first rods 2A and the pressing plate 5 are raised by the first air cylinder 2. Accordingly, the splice structure can be formed, and the splice structure is removed (removing process) to be applied to various products.

In addition, the heating body 4 of the wire splicing device 1 is held at a temperature at which the solder can be melted, and thus a subsequent wire connection operation can be immediately performed.

In addition, in the method for forming the second splice structure 21, the first wire 11 and the second wire 12 are disposed in the wire accommodation groove 7a so that the end portion 11a of the first wire 11 and the end portion 12a of the second wire 12 face each other, and the solder 14 is disposed to straddle the first wire 11 and the second wire 12. After the connection wire 13 is disposed on the solder 14, the second splice structure 21 can be formed in the same order as the above-described connection order.

In the wire splicing device 1 of this embodiment, the connection portion of the wires is heated by the heating body 4 via the pressing plate 5 so as to melt the solder, the heating body 4 is thereafter separated from the pressing plate 5 (that is, separated from the wires) while an application of pressure by the pressing plate 5 is maintained, and heating the wires can be immediately stopped. Accordingly, the wires are not continuously heated until the heating body 4 has cooled, and the time required to solidify the solder is reduced. Therefore, the time needed to make the connection is reduced.

In addition, in a case where the wire splicing device 1 of this embodiment is used for the connection of superconducting wires, the deterioration of the superconducting wires can be suppressed by reducing the heating time. Furthermore, since the heating time is reduced, in a case where a protection layer made of silver or a silver alloy is provided on the outer periphery of the superconducting wire or in a case where the boundary portion between a silver layer and a solder layer is provided therein, the diffusion of the solder through the silver layer can be suppressed. Therefore, an increase in the electrical resistance of the silver layer can be limited.

In addition, in the wire splicing device 1 of this embodiment, heating the connection portion of the wires is started or stopped by allowing the heating body 4 to come in contact with or be separated from the pressing plate 5. Therefore, the heating body 4 can be always held at a temperature at which the solder is melted. Therefore, in a case where a subsequent connection operation is consecutively performed, the heating body does not need to be re-heated, and the time it takes to increase the temperature of the heating body to a temperature at which the solder is melted can be reduced.

INDUSTRIAL APPLICABILITY

According to the embodiment, it is possible to provide a wire splicing device, a wire splicing method, and a method for manufacturing a splice structure which enable connection of wires that exhibit stable performance with high production efficiency.

DESCRIPTION OF REFERENCE NUMERAL

1: wire splicing device, 2: first air cylinder (first driver), 2A: first rod, 3: second air cylinder (second driver), 3A: second rod, 4: heating body, 4a: lower surface, 5: pressing plate, 5a: protrusion, 5b, 7b: upper surface, 6: air-cooling fan, 7: holding base, 7a: wire accommodation groove, 8, 11: first wire, 8a, 9a, 11a, 12a: end portion, 9, 12: second wire, 10, 14: solder, 13: connection wire, 20: first splice structure, 20A: pre-connection wire, 20B: molten solder wire, 20a, 21a: connection portion, 21: second splice structure

The invention claimed is:

1. A wire splicing method comprising:
disposing a tape-like first wire and a tape-like second wire in a holding base so that an end portion of the first wire and an end portion of the second wire face each other;
disposing solder to straddle the first wire and the second wire;
disposing a connection wire on the solder;
pressing a heating body to the first wire, the second wire, and the connection wire via a pressing plate, and pressing together and heating the first wire, the second wire, and the connection wire so as to melt the solder;
keeping the first wire, the second wire, and the connection wire pressed together by the pressing plate;
separating the heating body from the pressing plate; and
cooling the pressing plate to solidify the solder, and thereby connecting the first wire and the second wire together.

2. The wire splicing method according to claim 1, wherein the first wire, the second wire, and the connection wire are superconducting wires.

3. A method for manufacturing a splice structure comprising:
disposing a tape-like first wire and a tape-like second wire in a holding base so that an end portion of the first wire and an end portion of the second wire face each other;
disposing solder to straddle the first wire and the second wire;
disposing a connection wire on the solder;
pressing a heating body to the first wire, the second wire, and the connection wire via a pressing plate, and pressing together and heating the first wire, the second wire, and the connection wire so as to melt the solder;
keeping the first wire, the second wire, and the connection wire pressed together by the pressing plate,
separating the heating body from the pressing plate; and
cooling the pressing plate to solidify the solder, and thereby connecting the first wire and the second wire together.

4. The method for manufacturing a splice structure according to claim 3, wherein the first wire, the second wire, and the connection wire are superconducting wires.

5. The wire connection method according to claim 1, wherein
the first wire and the second wire are superconducting wires.

6. The method for manufacturing a connection structure according to claim 3, wherein the first wire and the second wire are superconducting wires.

\* \* \* \* \*